R. C. MALMQUIST.
SPRAY ATTACHMENT FOR HOSE NOZZLES.
APPLICATION FILED MAY 3, 1912.
1,044,795.
Patented Nov. 19, 1912.
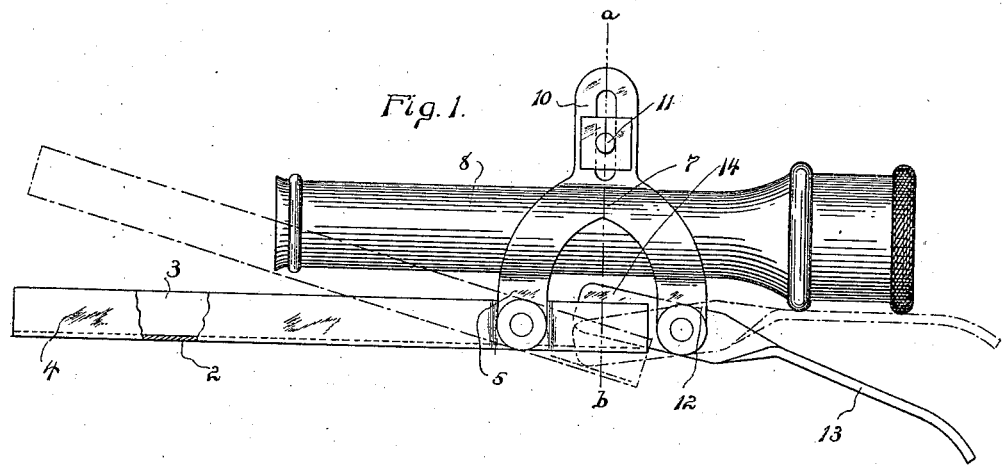
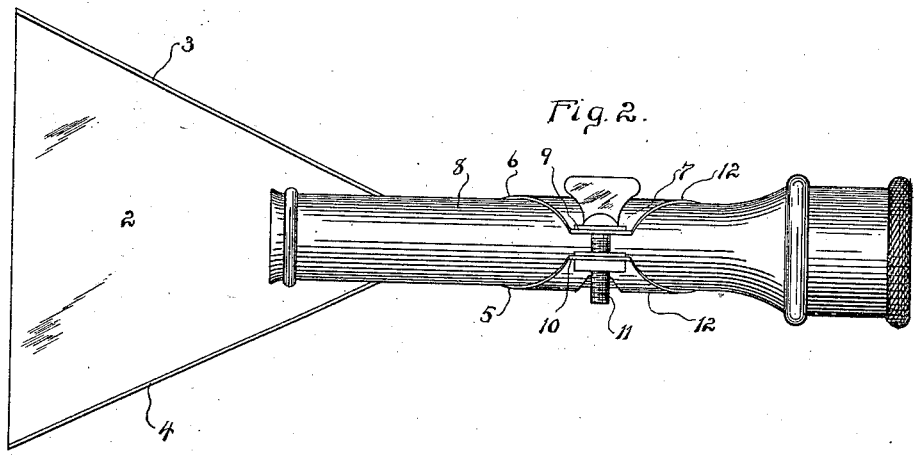
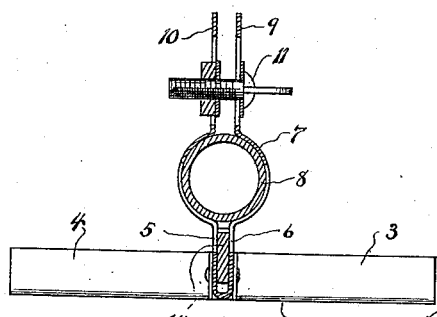

UNITED STATES PATENT OFFICE.

ROBERT C. MALMQUIST, OF NEW HAVEN, CONNECTICUT.

SPRAY ATTACHMENT FOR HOSE-NOZZLES.

1,044,795.  Specification of Letters Patent.  Patented Nov. 19, 1912.

Application filed May 3, 1912. Serial No. 694,941.

*To all whom it may concern:*

Be it known that I, ROBERT C. MALMQUIST, a citizen of the United States, residing at New Haven, in the county of New Haven and State of Connecticut, have invented a new and useful Improvement in Spray Attachments for Hose-Nozzles; and I do hereby declare the following, when taken in connection with the accompanying drawings and the characters of reference marked thereon, to be a full, clear, and exact description of the same, and which said drawings constitute part of this application, and represent, in—

Figure 1 a side view of a spray attachment for hose nozzles constructed in accordance with my invention, and shown attached to a hose nozzle. Fig. 2 a top or plan view of the same. Fig. 3 a sectional view on the line *a—b* of Fig. 1 looking toward the spray pan.

This invention relates to an improvement in spray attachments for hose nozzles, and particularly to attachments including a spray pan or plate arranged to project forward of the outer end of the hose nozzle and to be turned up into line with the nozzle so as to spray the stream of water and convert the jet into spray, the object being a simple arrangement of parts whereby the device may be readily attached to a hose nozzle and then brought into operating position when desired, and the invention consists in the construction hereinafter described and particularly recited in the claim.

In carrying out my invention, I employ a V-shaped pan 2 struck up from sheet metal with side flanges 3, 4. The inner end of the edges of the pan are brought together and secured between arms 5, 6, of a yoke 7 adapted to pass around a hose nozzle 8 of usual construction, the upper ends 9, 10 of the yoke being slotted for the reception of a bolt 11 by which the ends of the yoke are drawn together. The yoke is also formed with additional arms 12 extending downward to form a bearing for a handle lever 13 which is pivoted between the arms 12. The inner end 14 of the handle lever is adapted to enter between the folded sides of the inner end of the pan which sides are parallel and slightly separated for the reception of the said end 14. The handle portion of the lever is so heavy that its inner end will naturally drop, and so as to relieve the inner end of the pan from any pressure and so that the pan will stand in position below the outer end of the nozzle. If, however, the handle 13 be raised as shown in broken lines in Fig. 1, the end 14 of the handle lever will engage with the rear end of the pan and raise the pan against the outer end of the nozzle, and so that the outer edge of the pan will stand at a point considerably above the open end of the nozzle whereby a jet of water through the nozzle will strike the pan and be so spread and deflected as to be converted into spray. The side walls 3, 4 of the pan prevent the water escaping from the pan on opposite sides thereof. As soon as the handle lever is released the force of water will depress the outer end of the pan and permit the water to flow from the nozzle in the usual way.

I claim:—

A spray attachment for hose nozzles consisting of a V-shaped pan having vertical side walls, the inner ends of which stand parallel, a two-part yoke each part formed with a slotted end and with downwardly projecting arms, said parts of the yoke bearing on opposite sides of the nozzle to which they are secured by a bolt passing through said slotted ends, the inner end of the pan pivoted between two of the arms of the yoke, a handle lever pivoted between the other two arms of the yoke, the outer end of the handle lever engaging the inner end of the pan between the parallel portions of the side walls thereof, whereby when the handle is raised the pan will be lifted into line with the hose nozzle.

In testimony whereof, I have signed this specification in the presence of two subscribing witnesses.

ROBERT C. MALMQUIST.

Witnesses:
CARL W. MALMQUIST,
C. HUGO MALMQUIST.

---

Copies of this patent may be obtained for five cents each, by addressing the "Commissioner of Patents, Washington, D. C."